United States Patent
Koller

(10) Patent No.: US 11,930,353 B2
(45) Date of Patent: Mar. 12, 2024

(54) METHOD FOR MONITORING OR TRACKING BETWEEN MOBILE DEVICES

(71) Applicant: Tissot SA, Le Locle (CH)

(72) Inventor: Jean-Marc Koller, Yverdon-les-Bains (CH)

(73) Assignee: Tissot SA, Le Locle (CH)

( * ) Notice: Subject to any disclaimer, the term of this patent is extended or adjusted under 35 U.S.C. 154(b) by 437 days.

(21) Appl. No.: 17/274,562

(22) PCT Filed: Aug. 28, 2019

(86) PCT No.: PCT/EP2019/072975
§ 371 (c)(1),
(2) Date: Mar. 9, 2021

(87) PCT Pub. No.: WO2020/052980
PCT Pub. Date: Mar. 19, 2020

(65) Prior Publication Data
US 2022/0053322 A1    Feb. 17, 2022

(30) Foreign Application Priority Data

Sep. 10, 2018 (EP) .................................. 18193517

(51) Int. Cl.
*H04W 12/02* (2009.01)
*H04L 61/5038* (2022.01)
(Continued)

(52) U.S. Cl.
CPC ......... *H04W 12/02* (2013.01); *H04L 61/5038* (2022.05); *H04L 61/5092* (2022.05);
(Continued)

(58) Field of Classification Search
CPC .... H04W 12/02; H04W 12/71; H04L 61/5092
See application file for complete search history.

(56) References Cited

U.S. PATENT DOCUMENTS

2015/0372717 A1* 12/2015 Schrum, Jr. ............ H04B 3/544
370/458
2016/0212147 A1* 7/2016 Palin ................... H04L 63/0478
(Continued)

FOREIGN PATENT DOCUMENTS

CN        104247369 A      12/2014
JP        2015-510743 A     4/2015
(Continued)

OTHER PUBLICATIONS

Japanese Office Action dated May 24, 2022, in Japanese Patent Application No. 2021-537485 (with English translation), 6 pages.
(Continued)

*Primary Examiner* — Amal S Zenati
(74) *Attorney, Agent, or Firm* — Oblon, McClelland, Maier & Neustadt, L.L.P.

(57) ABSTRACT

In a method for monitoring or tracking between mobile devices of a same group, mobile devices broadcast messages in broadcast mode over a radio interface in compliance with a short-range digital communication protocol. The messages can be received by all other mobile devices in the vicinity and can communicate according to the protocol. The messages include encrypted data encrypted using at least one identifier of the emitter device and a seed intended for single use or having a short period of validity. The encrypted data can only be decrypted by a limited group of devices. The mobile devices receive messages broadcast by other devices and decrypt the messages intended for a group to which they belong. If the protocol provides that the message includes an address field of the emitter device, this field is filled with a randomised address intended for single use or having a short period of use.

20 Claims, 2 Drawing Sheets

(51) Int. Cl.
*H04L 61/5092* (2022.01)
*H04W 4/80* (2018.01)
*H04W 8/26* (2009.01)
*H04W 12/71* (2021.01)

(52) U.S. Cl.
CPC .............. *H04W 4/80* (2018.02); *H04W 8/26* (2013.01); *H04W 12/71* (2021.01)

(56) References Cited

U.S. PATENT DOCUMENTS

| | | | |
|---|---|---|---|
| 2017/0013450 A1 | 1/2017 | Ziv et al. | |
| 2017/0289105 A1 | 10/2017 | Minakuchi et al. | |
| 2018/0007555 A1 | 1/2018 | Ziv et al. | |
| 2018/0198752 A1* | 7/2018 | Zhang ................ | H04L 61/5038 |

FOREIGN PATENT DOCUMENTS

| JP | 2017-163250 A | 9/2017 |
|---|---|---|
| WO | WO 2013/126759 A2 | 8/2013 |
| WO | WO 2017/007719 A1 | 1/2017 |
| WO | WO 2018/088952 A1 | 5/2018 |

OTHER PUBLICATIONS

Combined Chinese Office Action and Search Report dated Sep. 7, 2022 in Patent Application No. 201980058819.4 (with English language translation and English translation of Category of Cited Documents), 13 pages.
International Search Report dated Oct. 7, 2019 in PCT/EP2019/072975 filed Aug. 28, 2019, 3 pages.
European Search Report dated Mar. 11, 2019 in European Patent Application No. 18 19 3517 filed Sep. 10, 2018, 4 pages.
Anonymous, "Advertising Interval—best practice", Support Center, XP055566513, 2017, 3 total pages.
Combined Chinese Office Action and Search Report dated Jun. 30, 2023 in Chinese Patent Application No. 201980058819.4 (with English translation of Office Action only), 12 pages.

* cited by examiner

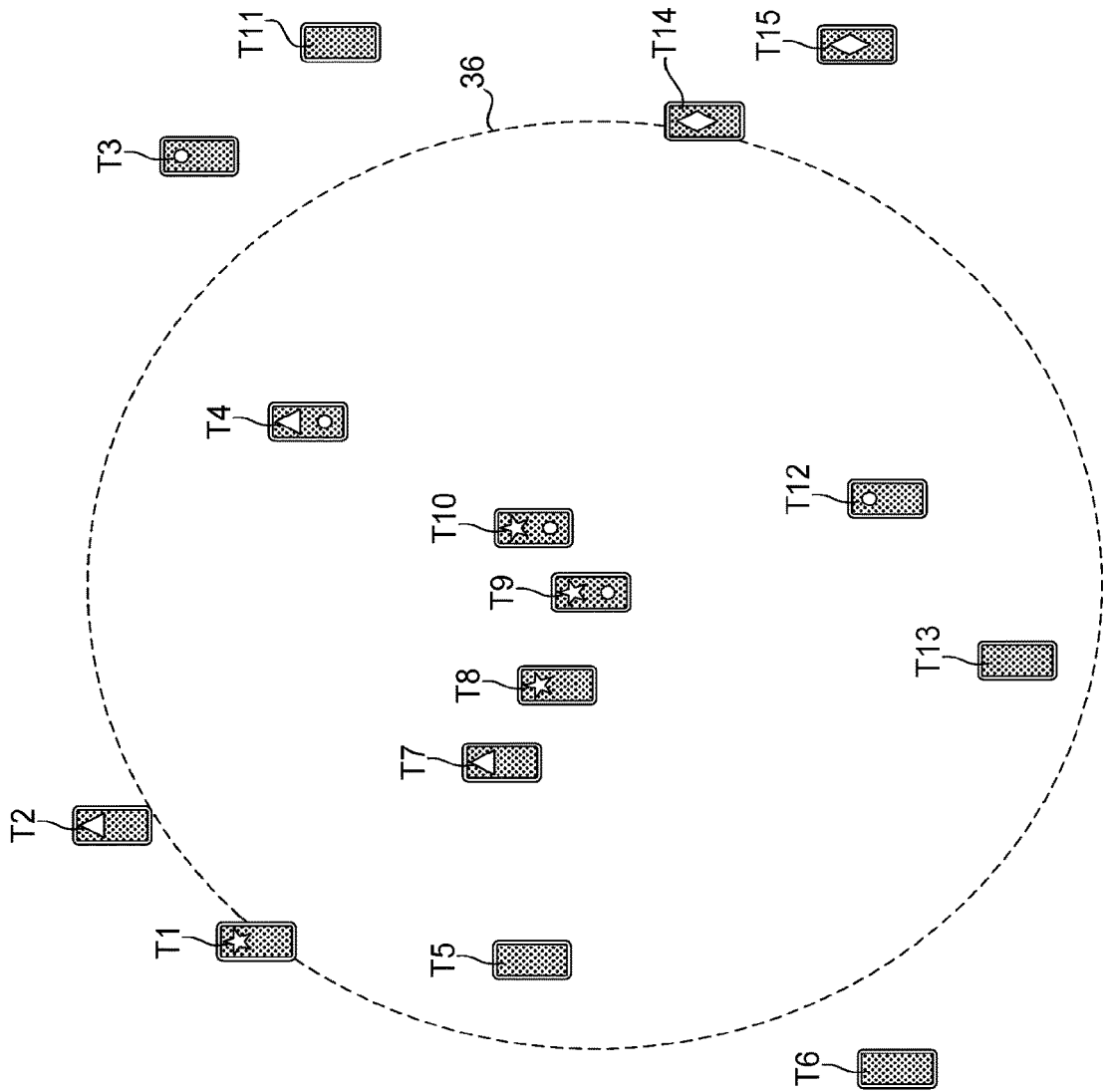

METHOD FOR MONITORING OR TRACKING BETWEEN MOBILE DEVICES

TECHNICAL FIELD AND PRIOR ART

In a general manner, the invention concerns monitoring or tracking between mobile devices within a limited group of mobile devices implementing a wireless communication procedure (i.e. on a radio interface), such as for example a Bluetooth, Bluetooth Low Energy ("Bluetooth LE" or "BLE") or other type of short-range digital communication protocol. More precisely, the invention concerns a method for monitoring or tracking between mobile devices of a same group of mobile devices making it possible, in particular, to make the same monitoring or the same tracking difficult, or even impossible, for mobile devices not belonging to the limited group.

Systems for tracking mobile devices exist. In order to enable their tracking and optionally their location, the mobile devices send messages to the entity that performs the tracking. However, such systems frequently suffer from the disadvantage that a communication link must be established between the tracked mobile device and the other entity. Another disadvantage resides in the fact that the messages exchanged or broadcast may make it possible for third parties to track the mobile device, without the knowledge and authorisation of the latter. According to the communication protocol, such an unauthorised tracking could be possible despite a potential encrypting of the content of the exchanged or broadcast messages.

The present invention aims to overcome these disadvantages.

DESCRIPTION OF THE INVENTION

A first aspect of the invention relates to a method for monitoring or tracking between mobile devices of a same group of mobile devices, wherein:
- the mobile devices broadcast messages in general broadcasting mode (broadcast) on a radio interface (or "air interface") in compliance with a short-range digital communication protocol (up to 500 m or less, for example up to 100 m, up to 10 m or up to 5 m), the messages being capable of being received by all the other mobile devices in the vicinity (of the emitter device) and capable of communicating, according to the protocol, messages comprising encrypted data obtained by encrypting at least the following elements: a) at least one identifier of the emitter device and b) a seed intended for single use or having a short period of validity, the encrypted data only being able to be decrypted by a limited group of mobile devices possessing a decryption key;
- mobile devices receive the messages broadcast by the other mobile devices and decrypt the messages intended for a group to which they belong; and
- wherein, if the protocol for short-range digital communication provides that the message comprises a field for the address of the emitter device, this field is filled with a randomised address intended for single use or having a short period of use.

In the context of this document, the term "mobile device" designates a computing device that can be used autonomously, capable of communicating according to the protocol, such as, for example, a mobile telephone, a mobile computer, a tablet, a smartwatch, a beacon, a smart sensor, a tag (e.g. theft-protection tag), etc. The adjective "mobile" in the expression "mobile devices" is not intended to imply that the mobile devices participating in the method are necessarily in a state of motion. The mobile devices could be temporarily or permanently fixed to a movable or immovable object.

It will be appreciated that, by means of the above method, the mobile devices that belong to a same group are capable, in particular, of monitoring whether the other mobile devices are present (in the vicinity). A possible application of the method would consist in, for example, defining a group of mobile telephones, smartwatches and other mobile devices of members of a family and for monitoring the presence of the children. The mobile devices of the parents could be configured so as to sound the alarm in the event that the messages from a device of a child are no longer received. Through signal power measurements, it would also be possible to estimate the distance at which the other devices are located. The mobile devices could be configured so as to raise an alarm in the event where the signal of another device of the group becomes too weak. Such an application would be useful, for example, in order to avoid losing sight of one's child in a store. It will be noted that the method according to the invention makes it possible to track members of the same group. The mobile devices which do not belong to the group are incapable of decrypting the message and do not therefore have access to the transmitted identifier. Further, given that the encrypted data contain a seed intended for single use or having a short period of validity, the encrypted data and thus the appearance of messages emitted by a same mobile device change relatively frequently. A tracking which relies on the detection of identical messages (without knowledge of the encrypted content) is therefore not possible. Since, where appropriate, the address field of the emitter is filled with a randomised address (a sequence of pseudorandom bits respecting the requirements of the protocol concerning the formatting of the address of the emitter), a third party will not be able to take useful information from this field.

The mobile devices preferably broadcast the messages on channels dedicated to or reserved for general broadcasting by the communication protocol. In the case of BLE, the "advertising" channels could be used for broadcasting messages.

The broadcast messages can be of small size. Preferably, the maximum size of the messages is that which is envisaged by the communication protocol for the packets transmitted on the radio interface. Preferably, the messages broadcast in the context of the method have a maximum size less than 200 bytes, less than 50 bytes or less than 20 bytes. The size of the messages can be fixed (i.e. be the same for all the messages) or free within an authorised range.

Each mobile device participating in the method can be a member of one or more limited groups. In the two cases, it emits, for each group to which it belongs, messages that can be decrypted by the respective group, at regular or irregular intervals. It may be preferable to impose a certain irregularity in the intervals in order to make it more difficult for a third party to track a mobile device by the timing of its emissions. The intervals preferably have a maximum duration of 2 minutes or less, for example 1 minute or less, 30 s or less, 20 s or less, 10 s or less or 5 s or less. In an alternative, it should be noted that in order to make third-party tracking even more difficult, all the mobile devices in this method can change the content of their transmission, for example at second 0 of each minute, in the case of an interval of 1 minute. In this way, all these mobile devices will change the content of the messages at the same time, preventing traceability through the changing of content. The mobile device could also slightly alter the emission power during this change, in order to prevent third-party tracking through the power of received fields.

In order to further cover its tracks, each mobile device could emit, in addition to the messages intended for the groups to which it belongs, dummy messages (resembling the messages intended for the members of the groups). In this way the mobile devices can conceal the number of groups to which they belong and it will be almost impossible for a third-party to identify a mobile device by counting the messages.

According to an advantageous embodiment of the invention, the seed is derived from a clock value of the emitter mobile device. However, any other variable value of the system status or a measurement (for example a measured power on electromagnetic signal) could serve as seed, possibly after transformation by a generator of pseudorandom numbers. If the emission time is transmitted in the encrypted data, the mobile devices will be capable of detecting replay attacks (or "playback attacks") by comparing the time of emission contained in the message with the time of reception. If the two differ too much, or if the difference does not remain reasonably constant over the course of messages deemed to be sent by the same mobile device, the receiver mobile device can raise an alarm.

The seed preferably has a period of validity of two minutes or less, preferably one minute or less, and wherein the randomised address has a period of use of two minutes or less, for example 1 minute or less, 30 s or less, 20 s or less, 10 s or less or 5 s or less. It should be noted that the change of seed should be made in such a way as to maximise the number of mobile devices changing their transmission simultaneously.

The randomised address used by a mobile device in a message intended for a certain limited group can preferably be predicted by the other mobile devices based on the content of one or more preceding messages emitted by the same emitter mobile device and intended for the same limited group. In this way, the mobile devices can more easily and more quickly identify messages which are intended for them. The predictability of the randomised addresses also facilitates the potential power level measurements.

A second aspect of the invention concerns a method for managing communication in order to enable a mobile device to participate in this monitoring or tracking method as described above. A management method according to the second aspect of the invention comprises:

managing emitted messages, including:
preparing encrypted data by encryption of at least one identifier of the emitter device and a seed intended for single use or having a short period of validity, the encrypted data only being able to be decrypted by a limited group of mobile devices possessing a decryption key;
preparing and broadcasting messages containing encrypted data in general broadcast mode in compliance with a short-range digital communication protocol; and
if the protocol for short-range digital communication provides that the message comprises a field for the address of the emitter device, this field is filled with a randomised address intended for single use or having a short period of use;
receiving messages emitted by other mobile devices, including attempting to decrypt the received messages;
managing successfully decrypted received messages; and
managing the groups as well as the encryption and/or decryption keys associated therewith.

The preparation and broadcasting of messages preferably comprise the timing of the emission of messages at regular or irregular intervals.

The preparation and broadcasting of messages can also comprise the preparation and broadcasting of dummy messages in order to conceal the number of groups to which the mobile device belongs.

As explained above, the seed can be derived from a clock value of the mobile device, from any other variable value of the state of the system or from a potential measurement after transformation by a pseudorandom number generator. The seed and the randomised address are preferably changed every two minutes or at shorter intervals (for example at intervals of one minute or less, of 30 seconds or less, of 20 seconds or less, of 10 seconds or less or of five seconds or less). The time of changing will be chosen in order to maximise the number of mobile devices changing the content at the same time, by taking, for example, the first minute and the last minute of each hour as reference point. The exact repetition interval within a change window could be slightly random, but the seed switch time should still be respected.

The communication management method may comprise predicting the randomised address used by another mobile device in a message intended for a limited group to which the mobile device belongs, executing the communication management method. Such a prediction could be made based on the content of one or more preceding messages emitted by the same other mobile device and intended for the same limited group.

The encrypted data preferably contain, in addition to the identifier of the emitter device and the seed, a secret, for example a key, a token allowing the other mobile devices of the limited group to predict a randomised address which will be used subsequently by the mobile device executing the communication management method.

A third aspect of the invention concerns mobile devices which are watches, in particular smartwatches, capable of implementing such a method.

A fourth aspect of the invention concerns a computer program comprising program code instructions for executing the steps of this method when said program is executed by the processing units of the mobile devices.

BRIEF DESCRIPTION OF THE FIGURES

Other specifications and features of the invention will emerge from the detailed description of certain advantageous embodiments given below by way of illustration and with reference to the attached drawings, which show:

FIG. 2: a schematic illustration of the method for monitoring and tracking between mobile devices of a same group according to an embodiment of the invention.

DESCRIPTION OF AN EMBODIMENT OF THE INVENTION

Figure 1:
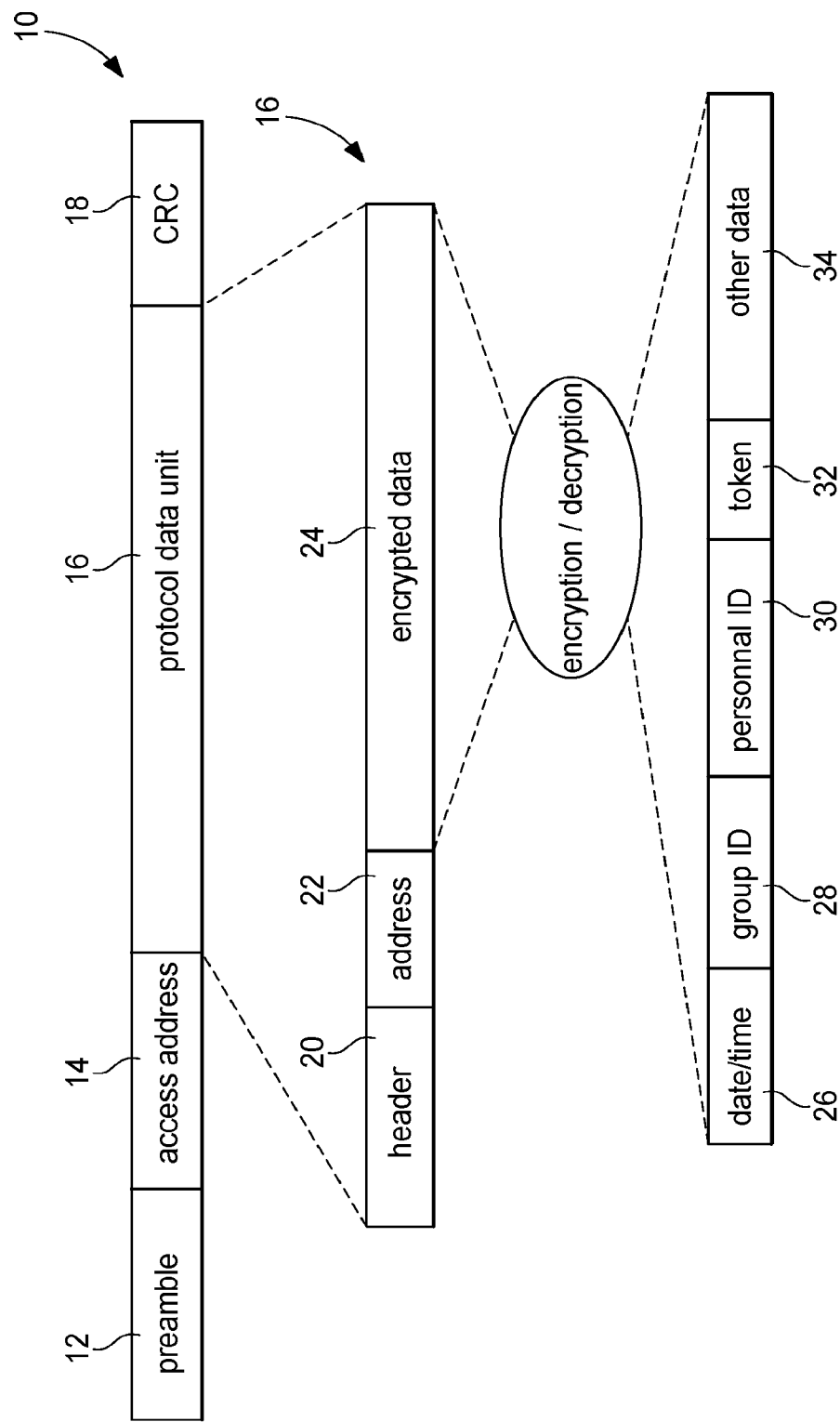
FIG. 1: the block diagram for a possible embodiment of the packets transmitted on the radio interface in a method according to the invention.

FIG. 1 shows the block diagram of a possible implementation of a packet 10 broadcast on the radio interface by the mobile devices implementing a method according to the first aspect of the invention. The digital communication protocol is advantageously BLE, but any other short-distance digital communication protocol could be used in general.

By way of example, the packet 10 shown in FIG. 1 could be broadcast on the "advertising" channels according to BLE. The packet 10 comprises four fields called "preamble" 12, "access address" 14, PDU ("protocol data unit") 16 and CRC ("cyclic redundancy check") 18. The content of the preamble and access address fields (which is not the address of the emitter device) is defined by the BLE protocol (see Bluetooth Specification Version 5.0). The CRC is calculated in compliance with the protocol. The protocol data unit 16 is of the "advertising PDU" type and contains a header 20 as well as a "payload". The payload is composed of an address field (intended to store the address of the emitter device) 22 and a data field 24. In this case, the address field contains a randomised address and the data are encrypted, in order that an unauthorised third party cannot identify the emitter device.

The encryption of the data is performed so that only members of a limited group of mobile devices can access the content. Any encryption algorithm having a sufficiently high level of security can be used in the context of the invention. The encryption can be symmetric or asymmetric. The members of a group possess the encryption and decryption key or keys.

The encrypted data contain, in the case of the illustrated packet 10, an identifier of the emitter device (personal ID) 30, a group identifier (group ID) 28, the date and time of emission 26, a token 32 and other data 34. The date and time information 26 serve as seed. Since it changes regularly (with a frequency which depends on the chosen precision), it serves to guarantee that the cryptogram changes from time to time.

Among the encrypted data, only the emitter device identifier 30 and the seed are compulsory. The other data are optional but can be useful for facilitating the processing of messages on reception. For example, the token 32 could serve as a key enabling the next randomised address which will be used by the emitter device and/or the time of emission of the next message, to be predicted.

FIG. 2 shows, schematically, mobile devices capable of communicating according to the short-range protocol on which the method according to the invention also relies. Certain of the devices have been configured, by means of a mobile application, to be able to participate in the method according to an embodiment of the invention. The mobile application makes it possible for users to create groups, the members of which can mutually track one another. The administration of the group, comprising, for example the admission of new members, the management of rights (for certain types of groups, it can be useful to envisage the possibility of defining different levels of rights among the members), etc. could be ensured by the initiator of the group or in a collective manner. When a mobile device joins a group, it receives a unique identifier within the group as well as the encryption/decryption key or keys. This information is preferably exchanged by means of a secure communication link.

The mobile devices participating in the method broadcast messages (like those illustrated in FIG. 1) in broadcast mode in compliance with the digital communication protocol. Each mobile device emits messages intended for each group to which it belongs. The emitter device address is randomised and the content of the message is encrypted. All the other mobile devices able to communicate according to the communication protocol and located in the vicinity of the emitter mobile device can receive the messages. However, only the members of the group to which the respective message was sent can decrypt the message and identify the device which emitted it.

In FIG. 2, the belonging of the mobile devices T1, T2, . . . , T15 to limited groups is indicated by symbols: star, triangle, circle, diamond. (The symbols and the group names used in this description have only being chosen in order to facilitate the explanations and are in no way to be considered as limitations). For example, the mobile devices T2, T4 and T7 belong to the "triangle" group. Some mobile devices belong to a plurality of groups at the same time, such as for example mobile devices T4 ("triangle" and "circle" groups), T9 ("star" and "circle" groups) and T10 ("star" and "circle" group). Other mobile devices do not belong to any group, namely devices T5, T6, T11 and T13.

The circle drawn as a dashed line indicates the limit of the reception zone 36 of the mobile device T9. The range of the other devices has not been drawn so as not to overload the drawing. It is useful to note that the reception zone of each mobile device is not necessarily circular or spherical but depends mainly on the environment of the respective device. The device T9 transmits messages to the "star" group and to the "circle" group. In principle, all the other mobile devices inside of the reception zone are capable of receiving these messages, including those which do not belong to any group and/or those which are not configured to participate in the method.

The mobile devices participating in the method attempt to decrypt the incoming messages using the keys which they possess. The decryption will not be possible for the messages intended for groups to which they do not belong. The messages intended for the "star" group sent by device T9 are decrypted by devices T8, T10 and, possibly, T1 if the message is still received. The messages intended for the "circle" group sent by the device T9 are decrypted by devices T4, T10 and T12. The device T3, being located outside the reception zone 36, does not receive the messages from T9.

Each message contains at least one identifier of the emitter mobile device. In the simplest case, each message received therefore signifies for the device which has decrypted it, that it is located in the reception zone of the emitter mobile device. As described above, it is possible that the payload of the messages comprises other data. These can in principle be freely chosen by the supplier of the mobile application or by the administrator of the group (provided the supplier of the application provides this possibility). Preferably, after decrypting a message, the mobile application proceeds to certain checks, in particular whether the time of emission recorded in the message is plausible.

In the case of the message of FIG. 1, the payload comprises a token 32 which makes it possible for the mobile devices having decrypted the message to predict the randomised address 22 of one or more future messages sent by the same emitter mobile device and intended for the same group. This token can therefore facilitate the processing of future messages, in particular the measurement of the incoming signal power. The token 32 could also contain a piece of information on one or more next emission times of messages sent by the same emitter mobile device and intended for the same group.

The use of the decrypted messages can be freely defined by the suppliers of the mobile application. In principle, the method allows the mobile devices of a limited group to track and be tracked by the other mobile devices of the same group. In the simplest case, the tracking consists in noting the presence or absence of a member of the group in the vicinity of the device which performs the tracking. An alert could then be given if a mobile device moves away from another member of the group. In the case of FIG. 2, device T1 is located at the limit of the reception zone of device T9. The mobile application on device T1 could be configured to give an audible, visual or other alarm to the user of T1 when the messages from device T9 are no longer received. Inversely, device T9 is located at the limit of the reception zone of device T1. The mobile application on device T9 could be configured to give an alarm to the user of T9 when the messages from device T1 are no longer received.

Various measures can be taken in order to avoid the mobile devices being tracked by unauthorised third parties by methods which do not require a priori knowledge of the content of the messages. The first measure envisages the use of a seed intended for single use or having a short period of validity for encrypting the messages. Therefore, even if the rest of the content of the message did not change, the cryptogram would change for each message transmitted. If the encrypted data record the emission time, it is furthermore possible to detect replay attacks.

The number of groups to which each mobile device belongs determines in principle how many messages it sends over a reference interval. This information could allow a third party to track a mobile device without having knowledge of the content of the messages. In order to avoid this type of attack, the mobile application could be configured to insert dummy messages between the messages intended for the groups and to vary the frequency of the dummy messages. Alternatively or in addition, the mobile application could vary the intervals between the messages emitted by the mobile device. It should be noted that the sending of certain messages could also be linked to time conditions, such as an identification linked to a professional activity which could be deactivated outside of working hours.

It should be noted that in a third aspect, the invention relates to mobile devices T1, . . . , T15 each of which is a watch, in particular a smartwatch, able to implement this method. Each mobile device T1, . . . , T15 then comprises a processing unit participating in implementing such a method.

Further, in a fourth aspect, the invention relates to a computer program comprising program code instructions for executing the steps of this method when said program is executed by the processing units of the mobile devices T1, . . . , T15.

Although particular embodiments have been described in detail, a person skilled in the art will appreciate that various modifications and alternatives to these can be developed in the light of the overall teaching provided by the present disclosure of the invention. Consequently, the specific arrangements and/or methods described herein are intended to be given by way of illustration only, without intending to limit the scope of the invention.

The invention claimed is:

1. A method for monitoring or tracking between mobile devices of a same group of mobile devices, comprising:
   the mobile devices broadcasting messages in general broadcast mode over a radio interface in compliance with a short-range digital communication protocol, the messages being able to be received by all other mobile devices in a vicinity and capable of communicating according to said protocol, the messages comprising encrypted data obtained by encryption of at least one identifier of an emitter device and a seed intended for single use or having a short period of validity, the encrypted data only being able to be decrypted by a limited group of devices possessing a decryption key; and
   the mobile devices receiving the messages broadcast by the other mobile devices and decrypting the messages intended for a group to which the mobile devices belong,
   wherein, if the protocol for short-range digital communication provides that the message comprises a field for an address of the emitter device, the field is filled with a randomised address that does not identify the address of the emitter device intended for single use or having a short period of use.

2. The method according to claim 1, comprising the mobile devices broadcasting the messages on channels dedicated to or reserved for general broadcasting by the communication protocol.

3. The method according to claim 1, comprising the mobile devices emitting, for each group to which they belong, messages that can be decrypted by a respective group, at regular or irregular intervals.

4. The method according to claim 3, wherein the intervals have a maximum duration of 2 minutes or less.

5. The method according to claim 1 wherein, in addition to the messages intended for the groups to which they belong, the mobile devices emit dummy messages in order to conceal a number of groups to which each mobile device belongs.

6. The method according to claim 1, wherein the seed is derived from a clock value of the mobile device.

7. The method according to claim 1, wherein the seed has a period of validity of two minutes or less, and wherein the randomised address has a period of use of two minutes or less.

8. The method according to claim 1, wherein the randomised address used by a mobile device in a message intended for a certain limited group can be predicted by the other mobile devices based on content of one or more preceding messages emitted by the same emitter mobile device and intended for the same limited group.

9. A method for communication management in order to allow a mobile device to participate in a method according to claim 1, comprising:
   managing emitted messages, including:
      preparing encrypted data by encryption of the at least one identifier of the emitter device and of the seed intended for single use or having the short period of validity, the encrypted data only being able to be decrypted by a limited group of mobile devices possessing a decryption key;
      preparing and broadcasting messages containing encrypted data in the general broadcast mode in compliance with the short-range digital communication protocol;
      if the short-range digital communication protocol provides that the message comprises the field for the address of the emitter device, the field is filled with the randomised address that does not identify the emitter device intended for single use or having a short period of use;
   receiving messages emitted by other mobile devices, including an attempt to decrypt the received messages;
   managing successfully decrypted received messages; and
   managing the groups as well as encryption and/or decryption keys associated therewith.

10. The method according to claim 9, wherein the preparation and broadcasting of messages comprise timing of emission of messages at regular or irregular intervals.

11. The method according to claim 10, wherein the preparation and broadcasting of messages comprise the preparation and broadcasting of dummy messages in order to conceal a number of groups to which the mobile device belongs.

12. The method according to claim 9, wherein the seed is derived from a clock value of the mobile device.

13. The method according to claim 9, wherein the seed and the randomised address are changed every two minutes or shorter intervals.

14. The method according to claim 9, comprising predicting a randomised address used by another mobile device in a message intended for a limited group to which the mobile device belongs, and executing the communication management method based on a content of one or more preceding messages emitted by the other mobile device and intended for the limited group.

15. The method according to claim 9, wherein the encrypted data contains, in addition to the identifier of the emitter device and the seed, a secret enabling the other mobile devices of the limited group to predict a randomised address which will be used by the mobile device executing the communication management method.

16. Mobile devices each being a watch which is configured to implement the method according to claim 1.

17. A non-transitory computer program product comprising program code instructions stored thereon that, when executed by processing units of the mobile devices cause the processing units to execute the method of claim 1.

18. The method according to claim 1, wherein the seed has a period of validity of one minute or less, and wherein the randomised address has a period of use of one minute or less.

19. The mobile devices according to claim 16, wherein the watch is a smartwatch.

20. The method according to claim 1, wherein the randomised address consists of a sequence of pseudorandom bits that do not identify the address of the emitter device.

* * * * *